United States Patent

Pain et al.

[11] Patent Number: 5,724,343
[45] Date of Patent: Mar. 3, 1998

[54] DEVICE FOR COMMUNICATIONS BETWEEN A PLURALITY OF FUNCTIONAL MODULES INSTALLED IN A LOCAL UNIT AND AN ARINC 629 TYPE EXTERNAL BUS

[75] Inventors: Isabelle Pain, Josas; Patrice Toillon, Le Pecq; Michel Ducateau, Nogent Le Roi; Christian Sannino, Vieille Eglise En Yvelines, all of France

[73] Assignee: Sextant Avionique, Velizy Villacoublay, France

[21] Appl. No.: 675,072

[22] Filed: Jul. 3, 1996

[30] Foreign Application Priority Data

Jul. 7, 1995 [FR] France ................... 95 08339

[51] Int. Cl.⁶ .................................. H04J 1/16
[52] U.S. Cl. ............................ 370/242; 370/438
[58] Field of Search ......................... 370/242, 245, 370/257, 438, 440, 445, 451, 489, 502, 911; 364/DIG. 1, DIG. 2, 240

[56] References Cited

U.S. PATENT DOCUMENTS

| | | | |
|---|---|---|---|
| 4,955,020 | 9/1990 | Stone et al. | 370/360 |
| 5,379,394 | 1/1995 | Goto | 395/306 |
| 5,495,585 | 2/1996 | Datwyler et al. | 395/280 |
| 5,581,553 | 12/1996 | Cave et al. | 370/362 |
| 5,590,286 | 12/1996 | Mehring et al. | 395/290 |
| 5,606,557 | 2/1997 | Kuroshita et al. | 370/364 |
| 5,621,895 | 4/1997 | Weis et al. | 370/407 |
| 5,659,718 | 8/1997 | Osman et al. | 395/551 |

FOREIGN PATENT DOCUMENTS 0566481  4/1992  European Pat. Off. ........ G06F 13/40

OTHER PUBLICATIONS

Hewlett–Packard Journal, vol. 43, No. 2, Apr. 1992, Palo Alto, US pp.6–14.

Oded Yishay; "Function Multiplexing Minimizes Pin Count Requirement", 1996 Internation Conference.

Toru Shimizu et al: "A Multimedia 32b RISC Microprocessor with 16 mb DRAM.", 1996 (ISSCC).

Primary Examiner—Hassan Kizou
Assistant Examiner—A. Bnimoussa
Attorney, Agent, or Firm—Browdy and Neimark

[57] ABSTRACT

In order to have the functional modules of a local unit communicate with one another and with an external bus, the device embodying the invention comprises: at least one internal bus of the same type as the external bus per functional module, the latter being coupled to the internal busses so that each module is the sole transmitter on at least one of the internal busses and is a receiver on the other internal busses; an additional internal bus for each external bus of the same type as said internal busses, ensuring the dissemination to the functional modules of data transiting on the external bus; and a coupling module ensuring transfer towards the external bus of the data circulating on the internal busses and destined for another local unit connected to the external bus.

11 Claims, 4 Drawing Sheets

DEVICE FOR COMMUNICATIONS BETWEEN A PLURALITY OF FUNCTIONAL MODULES INSTALLED IN A LOCAL UNIT AND AN ARINC 629 TYPE EXTERNAL BUS

BACKGROUND OF THE INVENTION

1. Field of the Invention

This invention relates to a device for communications between an external bus and a set of electronic modules installed in a local unit, such as an electronic bay.

It applies notably, though not exclusively, to the electronic equipment taken on board aerodynes, these items of equipment being interconnected by one or more busses called "airplane busses". Certain of theses items of equipment, and especially the computers, are integrated into shelves, each shelf grouping together a set of modules interconnected by an internal bus called a "backpanel bus".

2. Description of the Prior Art

As the number of items of electronic equipment interconnected on board an aerodyne tends to increase, it is necessary to be able to avail of an interconnection means reducing the number of physical links between the items of equipment, while achieving an increasingly higher data thruput on the airplane bus. The current trend is towards a solution using a multiplexed, multitransmitter and multireceiver bus such as the one defined by the ARINC 629 standard, this bus being capable of being associated with one or more other redundant busses for availability purposes, with all these busses thus defined being duplicated or triplicated in order to be able to transmit all the data required.

According to this standard, the bus is comprised of a pair of stranded wires enabling a useful thruput of 2 Mbits/s, each item of equipment sharing the bus via cyclical time windows. The data are transmitted by this bus in the form of frames grouping together messages comprised of one to 31 data blocks called wordstrings, of one to 257 20-bit words. This standard recommends, at the level of each transmitter, a looping back of the transmission onto the reception in order to have real-time checking of the quality of the data transmitted on the bus. Each module connected to the bus comprises two tables containing the identification and structure of the messages to be transmitted and of the data blocks to be received, as well as configuration parameters concerning the time windows to be allocated to each transmitter module.

Each item of equipment is permanently listening to the bus in order to detect whether or not there is any activity thereupon, and thus determine the instants at which it can transmit. This monitoring also enables it to recognize the identification codes of the data blocks destined for it.

With regard to communications between modules of a same shelf, the data thruput requirements are higher. The ARINC 659 standard was thus implemented to define a high-thruput (60 Mbits/s), redundant bus which is also a multiplexed multitransmitter and multireceiver bus.

Experience has shown that transmissions at such high thruputs are highly sensitive to electromagnetic interference and therefore require recourse to expensive technologies.

Furthermore, as the respective protocols, data formats and thruputs of the airplane bus and backpanel bus are different, and as these busses are asynchronous in relation to one another, the coupling modules interconnecting the airplane bus and the modules of a shelf inevitably introduce a delay time between the data transmission and require a manipulation of the data which reduces the reliability of the entire communications system.

In addition, the pass-band available to each of the airplane bus and backpanel bus is divided between the items of equipment and the modules by means of tables. Insofar as the airplane bus and backpanel bus are different, the airplane bus table and backpanel bus table have different structures which implies specific management for each type of table while ensuring overall coherence. Accordingly, the configuration of these tables implies substantial and complex work, whence a high risk of error.

OBJECT OF THE INVENTION

The main object of this invention is to remedy the preceding disadvantages, particularly to provide a device for communications between a plurality of functional modules installed in a local unit and at least one multiplexed, multitransmitter, multireceiver external bus for communications with other local units.

SUMMARY OF THE INVENTION

This device is characterized in that it comprises:

at least as many internal busses as there are functional modules susceptible of transmitting data to the other modules of the local unit and to the external bus, each internal bus being of the multiplexed, multitransmitter, multireceiver type, and complying with the time protocol and the format of the data transiting on the external bus; said functional modules being coupled to the internal busses so that each module susceptible of transmitting messages is the sole transmitter on at least one of the internal busses and a receiver on the other internal busses;

an additional internal bus for each external bus, ensuring dissemination within the local unit of the data transiting on the external bus, this dissemination bus being of the same type as said internal busses and being connected to the external bus and to the functional modules; and a coupling module designed to transfer, to the external bus, data circulating on the internal busses and destined for another local unit connected to the external bus.

This solution has numerous advantages. Firstly, each transmitter module has its own multitransmitter, multireceiver bus which it uses in single-transmitter mode. The transmission pass-band at the disposal of each module therefore corresponds to the entire pass-band of the bus, i.e. 2 Mbits/s in the case of an ARINC 629 type bus. There is therefore no shared dynamic allocation of the pass-band and therefore no risk of a faulty module monopolizing the internal bus.

As the internal busses are no longer multiplexed, there is complete physical isolation between the modules.

This solution uses a simplified coupling module insofar as, on the one hand, the type of busses used internally is the same as that of the external bus and there is therefore no need for any particular processing to transfer the data circulating on the external bus towards the inside of the local unit, with the exception of an electric conversion; and, on the other hand, the transmissions on the internal and external busses are carried out according to a same protocol and use the same data formats, so that the processing to be performed in order to transfer data from an internal bus to the external bus are highly simplified by comparison with a solution using two different types of busses.

Moreover, direct transfer without any intermediate processing of the data from the external bus to the internal dissemination bus avoids the introduction of a delay time and data manipulation causing additional failure risks.

Furthermore, due to the fact that the internal busses use the same space and time protocol as the external bus, the same tools can be used to set up the communications database grouping together the characteristics of all the data exchanged by the external bus, so as to make up frames and generate the tables defining, for each module, the data to be transmitted and received. Likewise, the tools for emulating and monitoring the external bus are comparable to those of the internal busses.

According to a feature of the invention, each functional module comprises a unit for monitoring the internal busses which is designed to sort all the data blocks circulating on the internal busses so as to only transfer the data blocks intended for the module, and to transmit messages on the bus allocated to the module.

According to another feature of the invention, the coupling module has an internal bus on which it is the sole transmitter, which enables it to transmit service and maintenance messages to the functional modules of the local unit, so as to be able to indicate to the functional modules any faulty message transfers or failures.

Advantageously, the coupling module is connected to at least two external busses coupled respectively to two internal dissemination busses so that the messages circulating on the two external busses are disseminated to the functional modules of the local unit.

BRIEF DESCRIPTION OF THE DRAWINGS

Further features and advantages of the invention will be apparent from an embodiment of the invention described, by way of a non-limiting example, in reference to the corresponding accompanying drawings in which.

DESCRIPTION OF THE PREFERRED EMBODIMENTS

Figure 1:
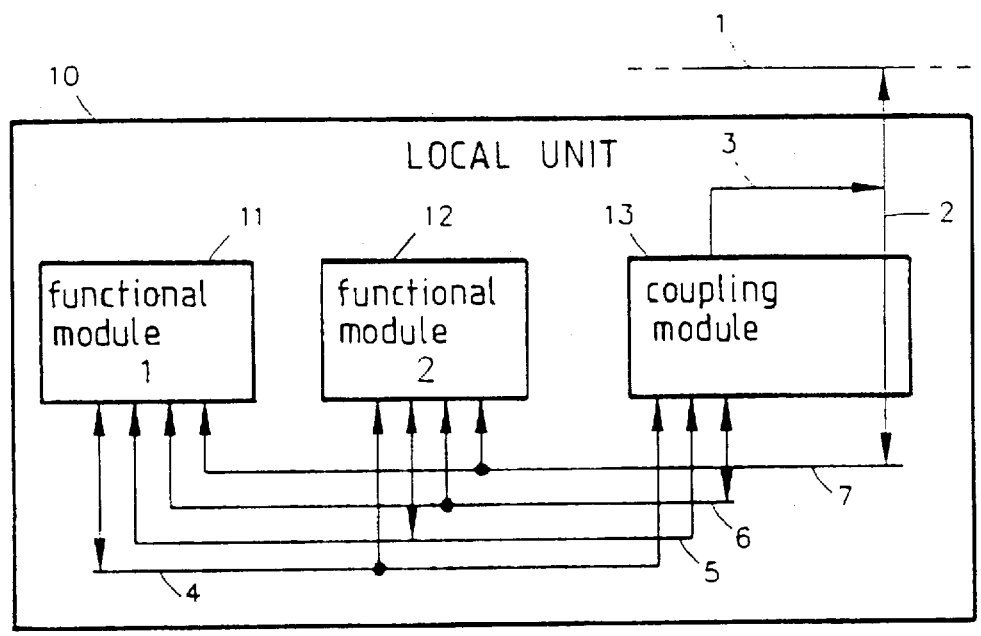
FIG. 1 schematically represents a local unit comprising a set of modules interconnected by means of the device embodying the invention.

FIG. 1 shows a local unit 10 or shelf taken on board an aerodyne and connected to an external bus 1 called "airplane bus".

This local unit 10 comprises a plurality of functional modules 11,12 and at least one coupling module 13, plugged into a backpanel enabling them to be connected to a set of internal busses 4 to 7, the coupling module 13 ensuring the interconnection between the external bus 1 and the internal busses 4 to 7.

The local unit 10 comprises at least as many internal busses 4 to 6 as there are modules susceptible of transmitting messages destined for the other modules of the local unit 10 or for a module situated in another local unit connected to the external bus 1, and an additional bus 7 connected to the external bus 1 by a connecting means 2, so that the messages transiting on the external bus are disseminated to the modules 11,12 of the local unit 10. Thus, each module 11 to 13 susceptible of transmitting messages avails of a bus 4 to 6 on which it is the sole transmitter.

The external bus 1 and the internal busses 4 to 7 are multiplexed, multitransmitter, multireceiver busses and are managed according to a same protocol, the internal busses 4 to 6 being used in single-transmitter mode.

Thus, the messages transiting on the external bus 1 are transmitted directly to the internal bus 7, without any processing, with the exception of an electric adaptation to allow for the variance in voltage level and wave shape between the external bus 1 and the internal bus 7.

Figure 2:
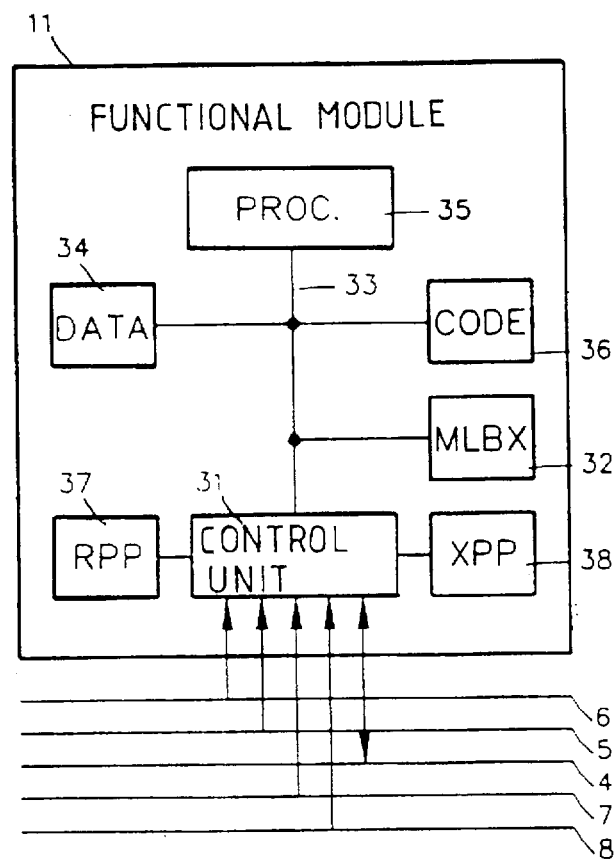
FIGS. 2 and 3 are schematic representations of the respective architectures of a functional module and a coupling module.

FIG. 2 shows an example of an internal architecture of a functional module 11. This module comprises a processor 35 connected via a processor bus 33 to a memory 36 containing the programme to be run, a working memory 34, and to a control unit 31 for the internal busses 4 to 8 which transfers messages between the internal busses 4 to 8 and an exchange memory 32 also connected to the processor bus 33 and acting as a mailbox. This control unit 31 is connected to the two non-volatile memories 37,38 in which are memorized the characteristics respectively describing the data to be received and to be transmitted.

In particular, within the framework of the ARINC 629 standard, the data transit on the busses in the form of data blocks called wordstrings comprising the messages emitted by the different modules connected to the busses. In this context, the memories 37,38 contain, for each data block, a block identification number known as a "label", the size of the block and its storage address in the exchange memory 32.

Figure 3:
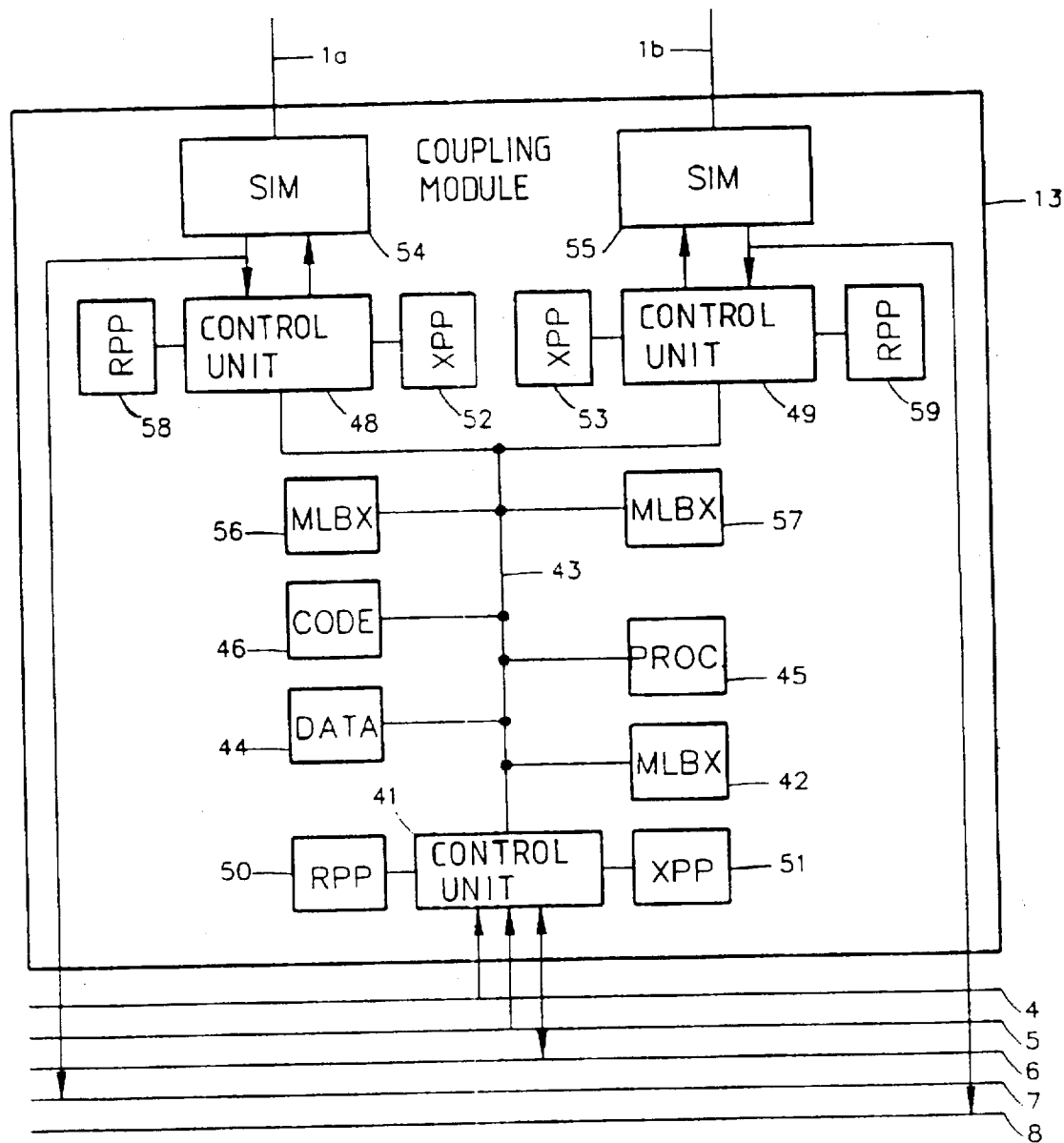

Likewise, FIG. 3 shows an example of the internal architecture of a coupling module 13 ensuring data transfer between the two external busses 1a,1b and the internal busses 4 to 8. This module is connected to the internal busses 4 to 6 via a control unit 41 similar to the control unit 31 of a functional module 11. This control unit transfers messages between the internal busses 4 to 6 and an exchange memory 42, the bus 6 being allocated to the coupling module 13 to enable it to transfer service and maintenance messages destined for other modules in the local unit 10.

Like the control unit 31 of a functional module 11, the control unit 41 is connected to two non-volatile memories 50 and 51 in which are stored all the data respectively describing the data blocks to be received and the messages to be transmitted.

The coupling module 13 also comprises a processor 45 connected, via a processor bus 43, to a memory 46 containing the programme to be run and a working memory 44 in which the data are memorized, and an exchange memory 42 in which are stored the messages received or to be transmitted on the internal busses 4 to 8.

For the purposes of economy, the physical data formats adopted on the internal busses 4 to 8 are different to those of the external busses, the transmission range constraints on the internal busses 4 to 8 being much lower than those imposed on the external busses 1a,1b.

It is for this reason that the coupling module 13 comprises two series interfacing circuits 54,55 respectively connected to the two external busses 1a,1b which ensure, in the external reception direction (from the respective external bus 1a,1b to the corresponding internal bus 7,8), transformation of the alternation type physical data into TTL type logical data, and the reverse transformation in the transmission direction.

The series interfacing circuits 54, 55 also have the function of checking the physical information.

The coupling module 13 also comprises two external bus control units 48,49 similar to the control unit 41 but with single-channel reception, respectively connected to the series interfacing circuits 54,55 to ensure transmission, on the external busses 1a,1b, of the messages located in a respective exchange memory 56,57. To this end, each of the two control units 48,49 is linked up to a respective non-volatile memory 52,53 containing the description of the messages to be transmitted, as well as to a respective non-volatile memory 58,59 containing the description of the data blocks to be received. The two exchange memories 56,57 are connected to the processor 45 via the bus 43, the processor 45 performing e.g. selection functions on redundant data coming from different backpanel physical channels and performing the required data transfers between the exchange memory 42 and the exchange memories 56,57.

Figure 4:
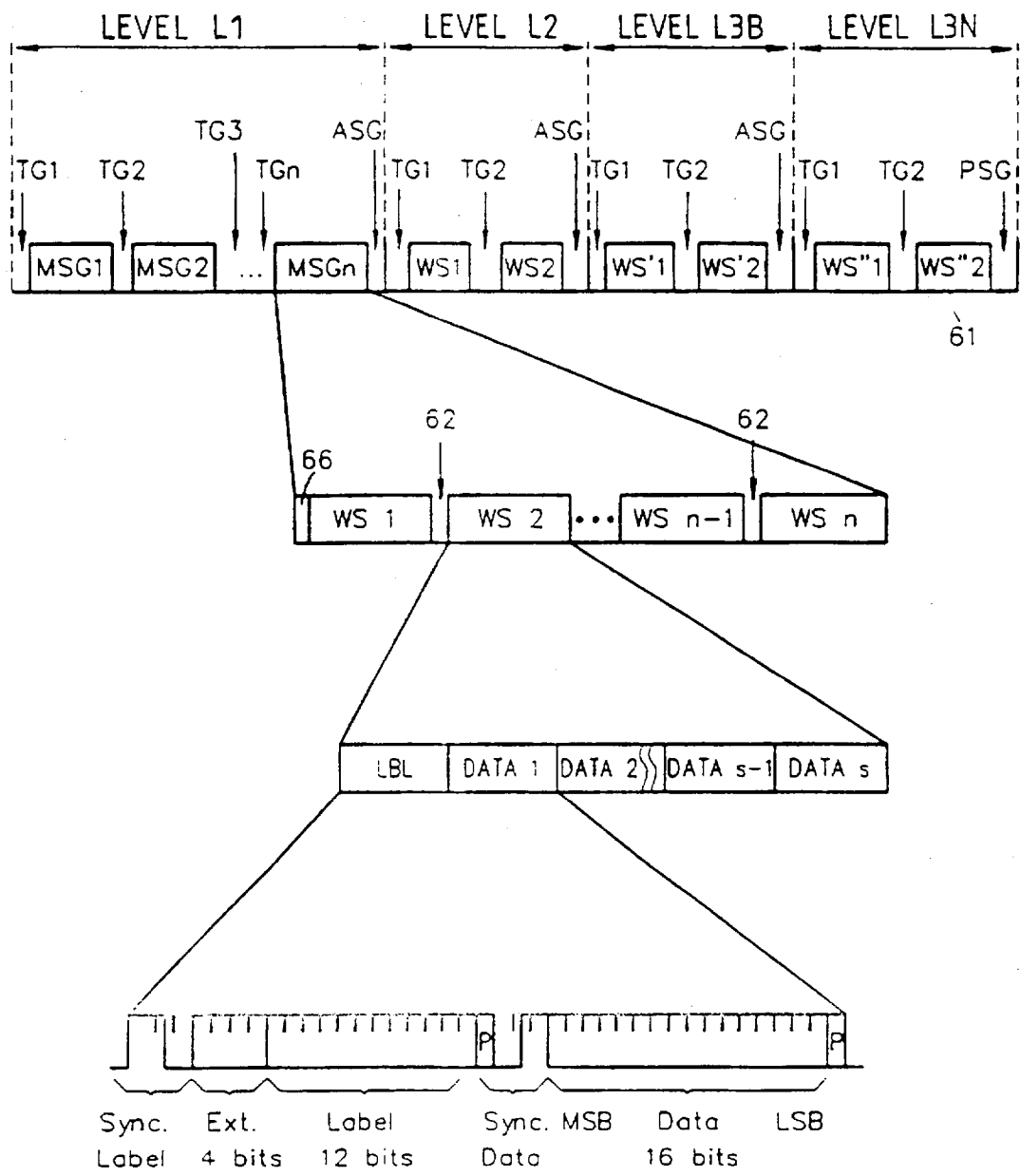
FIG. 4 shows the structure of the messages circulating on the internal and external busses.

FIG. 4 illustrates the construction principle of messages according to the ARINC 629 standard, transiting on the internal busses and on the external busses. These messages are grouped into periodic frames of period TI comprising successively, by transmitter terminal, on the bus under consideration:

a variable-size message MSG1, MSG2 ... MSGn, said to be of periodical level L1, then, as a function of the remaining available space in the frame 61:

at least one data block WS1, WS2, said to be of aperiodic level L2, at most one data block WS1', WS2', said to be of aperiodic level L3B, and possibly at least one data block WS1", WS2" by aperiodic level L3N, with the possibility of several L3N levels following one another in the frame 61.

The different levels L1, L2, L3B and L3N can be detected by means of a predefined time interval ASG separating them, the ends of the frames 61 being marked by a predefined time interval PSG.

Each L1 level message is comprised of a synchronization datum 66 and then by a succession of 1 to 31 data blocks WS 1 to WS n which are separated by a predefined time interval 62.

Each data block is comprised of a string of 20-bit words, including one label word LBL identifying the transmitter and the contents of the data block, followed by 0 to 256 data words DATA 1 to DATA s, the first data word DATA 1 specifying the number of data words in the data block in the case of a variable-length wordstring only. A label word LBL comprises 3 synchronization bits, 4 extension bits enabling the transmitter of the data block to be identified, 12 bits identifying the contents of the data block and one parity bit P. The data words comprise 3 synchronization bits, followed by 16 data bits and one parity bit P.

It should be noted that the marking of the data associated with a label is not at message level but at data block level. Consequently, all the data transfer services performed by the control units 31,41 and 48, 49 are performed data block by data block, and not message by message.

For reception, all the data blocks circulating on the internal busses 4 to 8 are examined by the control unit 31,41. When a data block comprises a label indicated in the corresponding memory 37,50, the control unit 31,41 stores this data block in the exchange memory 32,42, at the address associated with the identification code in the memory 37,50, at an address which depends on the number of the internal bus on which the message was received and on data read in the memory 37,50 and associated with the label. The number of the bus which transmitted the message enables the transmitter module to be identified since each internal bus is associated with a single transmitter module.

In order not to have to interrupt the applications executed by the processor 35 or 45 of the functional modules 11,12 or the coupling module 13, the storage areas for the data blocks received can be managed on a rotating buffer area basis, thus enabling reading of the data by the processor 35,45 to be deferred without risking crushing the data.

The application reception requests are piloted by the processor 35 or 45 which carries out a transfer from the exchange memory 32,42 to the respective data memories 34,44 of the processors, for each frame received, so as to regularly dump the rotating buffer areas of the exchange memories 32,42.

For transmission, the processor 35 or 45 computes a checksum (Cyclic Redundancy Check) for each of the data blocks of the message to be transmitted, then successively transmits each data block of the message, accompanied by the checksum, to the exchange memory 32,42, at the address corresponding to the data block.

Then, if the internal busses 4 to 8 are managed in accordance with the ARINC 629 standard, the control unit 31,41 reads, in the non-volatile memory 38,51, the description of the messages to be transmitted to the next bus access. The control unit 31,41, which is permanently listening in on its transmission bus 4,6, seeks to detect the level L1, L2, L3B or L3N in process, and determines the instant at which it can transmit within the level in process, by detection of a time interval TG specific to the control unit 31,41.

It thus transmits the data blocks of a periodic message during the level L1, as well as any aperiodic data blocks, upon request from the processors, during the levels L2, L3N and L3N. The level L2 is theoretically reserved for the short and urgent aperiodic messages, the L3N for the other long aperiodic messages, and the level L3B for the aperiodic messages which it was not possible to transmit during the previous transmission cycles.

According to the ARINC 629 standard, each message transmitted by the control unit 31,41 on the bus 4,6 allocated to the module 11,13 is simultaneously received by this same circuit 31,41 which can thus detect transmission errors by comparing the data transmitted with the data received.

This is also true of each message transmitted by the control units 48,49 on the external busses 1a,1b.

In the case of the coupling module 13, transmission of a message on one of the external busses 1a,1b consists, firstly, for the processor 45, in transferring the data from the exchange memory 42 to one or other of the exchange memories 56,57 selected as a function of the external bus 1a or 1b on which the message is to be transmitted, then, for the control unit 48,49 connected to the selected exchange memory 56,57, in transferring the data in the form of data blocks on the external bus 1a,1b to which it is connected. The messages arriving on the internal busses 4 to 6 destined for the terminals connected to the external busses 1a,1b are thus transmitted gradually.

According to the ARINC 629 standard, each module 11,12,13 connected to a bus of this type is associated with a single time interval TG, and must firstly listen in on the bus to detect whether the latter is free during this time interval TG. Should this condition be fulfilled, it can then transmit the message. Moreover, in order to avoid the modules allocated to the shortest time intervals monopolizing the busses, they are prohibited from transmitting several messages on a same level L1, L2, L3B or on each of the levels L3N during the period TI of the frame, each prohibition being successively raised by the level change datum ASG.

With regard to the synchronization of transmissions on the different internal busses of a shelf, there are several possible solutions.

According to a first solution, each control unit is left to manage its transmissions independently of the other modules, which results in a complete asynchronism of the different internal busses and perfect independence between the modules. According to a second solution, the control units comprise a failure-tolerant mechanism which enables them to become synchronous with one another, while listening in on all the busses 4 to 8 and eliminating any faulty lines. Synchronization is performed at frame level, with all the control units connected to the internal busses 4 to 8 starting, simultaneously and in a predefined manner, the transmission of each new frame.

Figure 5:
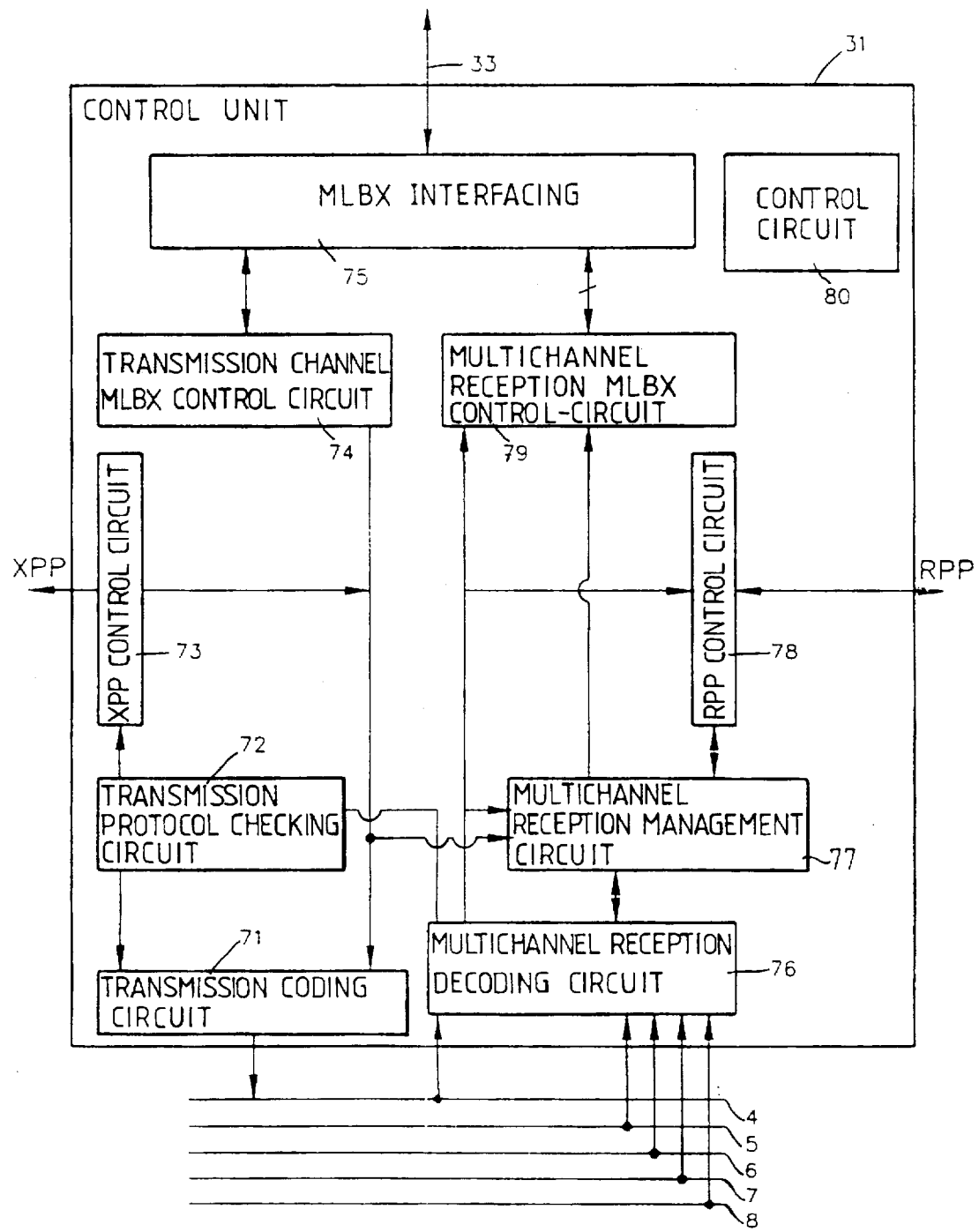
FIG. 5 shows an example of the functional architecture of a control unit ensuring data transfer between a functional or coupling module and the internal busses.

In FIG. 5, a control unit 31,41 comprises, for the transmission of messages on the internal transmission bus, e.g. 4, allocated to the control unit:

- a transmission coding circuit 71 connected to the internal bus 4 and performing the formatting, serialisation and coding of the data to be transmitted,
- a transmission protocol checking circuit 72 which manages the decision-making protocol (time format) for the transmission of data on the bus, and the checking of the spatial format of the messages being transmitted,
- a circuit 73 controlling the non-volatile transmission memory 38,51 containing the description of the messages to be transmitted and the address of the latter in the exchange memory 32,42, this control circuit 73 reading the description data associated with each of the data blocks of a given message to be transmitted, said data blocks being contained in the non-volatile memory 38,51, and
- a circuit 74 controlling the transmissions of the exchange memory 32,42, which manages the transmissions of an interfacing circuit 75 for the acquisition and monitoring of data to be transmitted, the interfacing circuit 75 managing the different requests for access to the exchange memory 32,42 via the address and data transfer bus 33,43.

The control unit 31.41 comprises, for the receiving of data transiting on the internal busses 4 to 8:

- a multichannel reception decoding circuit 76 designed to detect the activity of each bus or channel, deserialize the data received on each of the channels, and perform physical and partially logical monitoring channel by channel,
- a multichannel reception management circuit 77 which manages and monitors the label and data words received on each channel, and schedules the processing to be performed to receive the data transmitted by each channel,
- a circuit 78 controlling the non-volatile reception memory 37,50 containing the description of the data blocks to be received as well as the addresses of the latter in the exchange memory 32,42, this control circuit 78 reading the description data associated with a data block received by one channel, said data being contained in the non-volatile memory 37,50, and
- a circuit 79 for controlling the reception of the exchange memory 32,42, said circuit performing reception management of the interfacing circuit 75 for the supply and monitoring of the data received.

Furthermore, the control unit 31.41 comprises a control circuit 80 which enables an external entity to configure, monitor and control the different devices of the control unit.

It should be noted that the multichannel reception decoding circuit 76 is also connected to the bus 4 in order to receive the data blocks transmitted by the transmission coding circuit 71. The data to be transmitted used by the transmission coding circuit 71 are generally supplied directly to the multichannel reception management circuit 77, in order to enable transmission quality control to be carried out by comparing the data transmitted with the data received.

Such a control unit 31.41 can advantageously be integrated in an ASIC.

We claim:

1. A device for communications between a plurality of functional modules installed in a local unit and a multiplexed, multitransmitter, multireceiver external bus for communications with other local units, said device comprising:

at least as many internal busses as there are functional modules susceptible of transmitting data to the other modules of said local unit and to said external bus, each internal bus being of the multiplexed, multitransmitter, multireceiver type, and complying with the time protocol and the format of the data transiting on said external bus, said functional modules being coupled to said internal busses so that each module susceptible of transmitting data is the sole transmitter on at least one of said internal busses and a receiver on the other internal busses;

an additional internal bus associated with the external bus, ensuring dissemination within said local unit of the data transiting on said external bus, this dissemination bus being of the same type as said internal busses and being connected to said external bus and to said functional modules; and a coupling module designed to transfer, to said external bus, data circulating on said internal busses and destined for another local unit connected to said external bus.

2. The device as claimed in claim 1, wherein each functional module comprises a control unit connected to each of the internal busses, designed to sort all the data circulating on the internal busses so as to only receive data destined for the module and to transmit data to said module on the internal bus allocated to transmission.

3. The device as claimed in claim 2, wherein the control unit is connected to non-volatile memories containing the identification and description of the characteristics of the data to be received and transmitted, as well as the sequencing of the data to be transmitted, the control unit comprising a means for detecting, on the internal busses, the data to be received, and for transferring the latter into an exchange memory.

4. The device as claimed in claim 2, wherein the control unit comprises a means for listening in on the bus assigned to transmission, for comparing, while they are being transmitted, the data transmitted on the bus with the data read simultaneously on the bus, and for invalidating the data transmission in process and generating an error signal when the comparison reveals a variance.

5. The device as claimed in claim 1, wherein the coupling module comprises a means for recognizing which data circulating on the internal busses are to be transmitted to the external bus.

6. The device as claimed in claim 1, wherein the data circulating on the internal busses and on the external bus are broken down into periodic frames, and of which the characteristics are defined in the tables connected to the control unit.

7. The device as claimed in claim 2, wherein the control unit is integrated into an ASIC.

8. The device as claimed in claim 1, wherein the coupling module comprises a first control unit connected to the internal busses not connected to the external bus, a first exchange memory connected to said control unit, to a processor, to a second exchange memory, and to a second control unit similar to the first one and transferring data from said second exchange memory to the external bus.

9. The device as claimed in claim 1, wherein the coupling module has an internal bus on which it is the sole transmitter, enabling it to send service and maintenance data to the functional modules of the local unit, so as to indicate, to the functional modules, the data transfer faults on the external bus as well as any failures.

10. The device as claimed in claim 8, wherein the coupling module comprises a series interfacing circuit converting the analog signal conveying the data on the external bus into a logic signal applied to the internal dissemination bus, and vice versa to transfer data emitted by the second control unit to said external bus.

11. The device as claimed in claim 8, wherein the coupling module is connected to a second external bus of the same type as the first external bus, and connected to an internal bus via a second series interfacing circuit, the processor being connected to a third exchange memory and to said second external bus via a third control unit and the second series interfacing circuit.

* * * * *